United States Patent

Keller et al.

[15] 3,649,817

[45] Mar. 14, 1972

[54] ARITHMETIC AND LOGICAL UNIT WITH ERROR CHECKING

[72] Inventors: Günter Keller; Guenter Knauft, both of Boeblingen; Petar Skuin, Magstadt; Edwin Vogt, Boeblingen, all of Germany

[73] Assignee: International Business Machines Corporation, Armonk, N.Y.

[22] Filed: July 29, 1970

[21] Appl. No.: 59,220

[30] Foreign Application Priority Data

July 31, 1969 Germany......................P 19 38 912.9

[52] U.S. Cl..............................................................235/153

[51] Int. Cl........................................................G06f 11/10

[58] Field of Search...................340/146.1; 235/153; 328/92

[56] References Cited

UNITED STATES PATENTS 3,111,578 11/1963 Gerrand et al.........................235/153

3,300,625 1/1967 Deng et al..............................235/153

3,342,983 9/1967 Pitkowsky et al......................235/153

3,555,255 1/1971 Toy.......................................235/153

OTHER PUBLICATIONS

Sellers et al., al., Error Detecting Logic for Digital Computers, McGraw- Hill Co., 1968, pp. 172- 176.

*Primary Examiner*—Charles E. Atkinson
*Attorney*—Hanifin and Jancin and Edward S. Gershuny

[57] ABSTRACT

In an arithmetic and logical unit suitable for "Adding," "AND," "OR" and "Exclusive OR" operations, additions are performed to the carry-dependent sum formation principle, while during the execution of logical operations, operand bit parity functions related to the respective operation are generated by means of a function generator. In an operation-dependent checking circuit the carries of additions or the parity functions of logical operations are combined for result parity prediction independently of the sum formed. For error-checking the result, the parity of the result bits is compared for compliance with the predicted parity.

7 Claims, 6 Drawing Figures

INVENTORS
GUNTER KELLER
GUNTER KNAUFT
PETAR SKUIN
EDWIN VOGT

BY Edward S. Gershuny

ATTORNEY

ARITHMETIC AND LOGICAL UNIT WITH ERROR CHECKING

BACKGROUND OF THE INVENTION

The invention relates to an arithmetic and logical unit for performing "Adding," "AND," "OR," and "Exclusive OR" operations with carry-dependent sum formation for the purpose of error-checking the carry and sum bits by parity prediction by means of Exclusive ORing of the operand and the carry parities and by comparing the predicted with the actual result parity.

For error-checking the sum to be formed, known adders employ a circuit which predicts whether the parity of a sum is odd- or even-numbered and whereby the said parity is subsequently compared with the actual parity of the sum formed. For prediction, the parity of the operands and the parity of the carries processed while forming the sum are combined by Exclusive ORing. This method is disadvantages in so far as in existing adders any error causes an equal number of errors in the generated carry and sum bits. It is true that erroneous carries lead to the prediction of an incorrect sum parity, but since the falsified sum leads to an equally falsified parity value, such errors are not accessible to checking.

Adders have become known (U.S. Pat. No. 3,234,373) which eliminate this disadvantage by generating the sum as a function of the carry. If, for example, an erroneous carry is generated in one of the adder positions, this does not only cause the sum of the next higher position and possibly the carry and the sum of the next but one position to be falsified, which in each case would result in the same number of errors in the carry and the sum bits, but also the sum of the position, in which the erroneous carry occurred, to become incorrect. Thus the number of errors in the carry and the sum bits is no longer equal, and the error is detectable by comparing the actual with the predicted result parity.

The known adder is solely suitable for arithmetic operations. In data processors it is, however, frequently necessary to employ the arithmetic unit not only for arithmetic operations but also for logical combinations, such as AND, OR and Exclusive OR, which also require a result check.

It is an object of the invention to provide a combined arithmetic and logical unit in which the error-checking principle as explained above can be employed both for arithmetic operations and logical combinations of the operands. To this end one embodiment of the invention is characterized in that there are provided a function generator circuit which, as a function of the operation control signals for the logical operations, produces a parity function relates to the respectively operation, and a checking circuit which, by Exclusive ORing the operand parity with the parity function independently of the result of the logical operation, generates the related parity which is subsequently subjected to a parity comparison.

The arithmetic and logical unit has the advantage that by generating separate parity functions when logically combining the operands, the result can be error-checked in the same manner and with some of the circuits as are employed for error-checking the arithmetic results.

The foregoing and other objects, features and advantages of the invention will be apparent from the following more particular description of the invention as illustrated in the accompanying drawings.

DETAILED DESCRIPTION OF THE INVENTION

Figure 1:
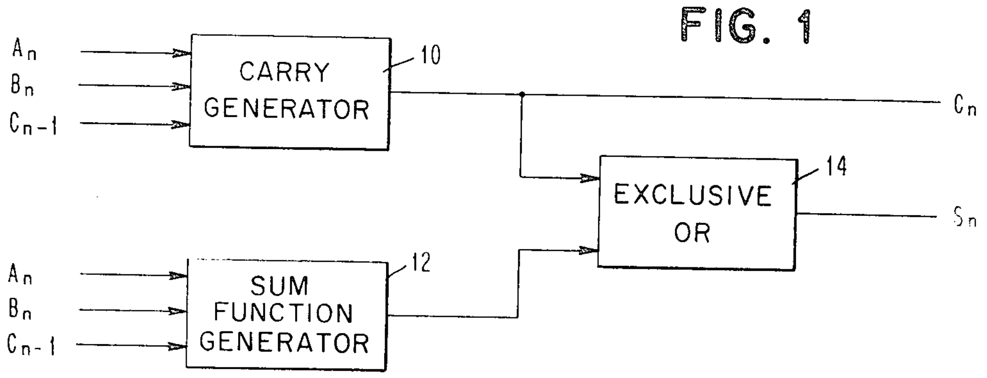
FIG. 1 block diagram of a known adder with carry-dependent sum formation.

FIG. 1 shows a known adder in which the sum is formed as a function of the carry. This adder consists of a carry generator 10, a sum function generator 12 and an Exclusive OR circuit 14. Provided the adder is designed as a binary full adder for one binary position, then the carry generator 10 generates the carry $C_n$ from the binary operands A and B of position *n* and the carry C from the next lower position *n*-1. To this end the carry generator consists of a logical network which is designed to the Boolean relationship $$C_n = (A_n \cdot B_n + (A_n \cdot C_{n-1}) + (B_n \cdot C_{n-1}).$$

According to the latter, each logical multiplication in the carry generator 10 is embodied in a known manner by an AND circuit and each logical addition by an OR circuit.

The sum function generator 12 derives a sum function SFn from the identical input signals $A_n$, $B_n$, $C_{n-1}$. The Boolean expression for the sum function is $$SF_n = (A_n + B_n\, C_{n-1}) \cdot (\overline{A_n} + \overline{B_n} + \overline{C_{n-1}}).$$

The sum function $SF_n$ and the carry $C_n$ are jointly transferred to the exclusive OR-circuit 14, the output of which supplies the binary sum $S_n$.

The design of such an adder has the advantage that individual errors are relatively readily detectable. Error checking in adders is in most cases effected by predicting the parity of the sum. Parity, in this context, means the binary value which is necessary for supplementing the digit sum of all the bits of a value to an odd- or even-numbered binary value. Thus each number fed to the arithmetic unit includes an additional bit which serves for parity indication. The corresponding number can be checked for correctness by its parity being newly formed and by the result being compared with the associated parity bit. The same pattern is adopted for checking the result of a binary addition. The sum parity $P_S$ is predicted independently of the generated sum by Exclusive ORing the parity of the operands and the processed carries in accordance with the relationship $$P_S = P_A \forall P_B \forall P_C$$

where $P_A$ is the parity of the operand A, $P_B$ the parity of the operand B and $P_C$ the parity of the carries processed during addition. Upon completion of addition, the parity of the generated sum is determined and compared for compliance with the predicted parity.

This method of checking is only successful in the case of carry or sum errors. Where an equal number of errors occurs in the processed carries and the sum bits, the predicted sum parity $P_S$ is equivalent to the actual sum parity, irrespective of whether of not the sum is erroneous. In the adder of FIG. 1 this shortcoming is counteracted by the sum bit in each position being formed, in the manner described, as a function of the carry generated in that position. If the carry is erroneous, this results in the bit of the next higher bit position being falsified and an erroneous sum bit being formed in the corresponding position so that there are one erroneous bit in the carries and two erroneous bits in the generated sum. Thus a comparison of the predicted parity with the actual sum parity leads to the error being detected. The same applies where, as a result of an erroneous carry in several of the next higher adder positions, an equal number of erroneous carries and sum bits is generated. In such a case, too, the erroneous sum bit of the position which generated the first erroneous carry causes the number of the erroneous carries and the number of the erroneous sum bits to be unequal, so that the error can be detected by parity comparison.

Figure 2:
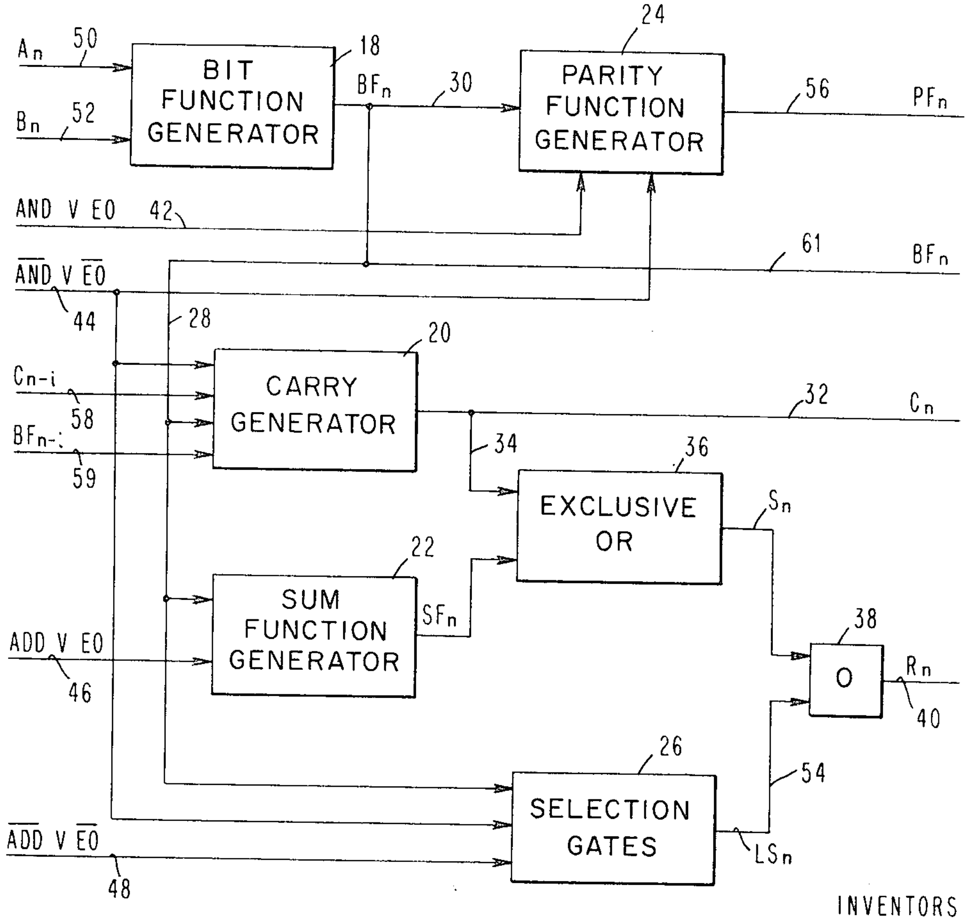
FIG. 2 simplified block diagram of a position of the arithmetic and logical unit in accordance with the invention.

FIG. 2 shows the design in accordance with the invention of an arithmetic and logical unit in which the sum is generated as a function of the carry, and which permits employing the above error check also for logical operations. The arithmetic and logical unit comprises a bit function generator 18 which generates the bit functions $BF_n$ from the operand bits $A_n$ and $B_n$. Moreover, the arithmetic and logical unit includes a carry generator 20, a sum function generator 22, a parity function generator 24 and a selector gate circuit 26, to which the bit functions $BF_n$ are applied via buses 28 and 30. Carry generator 20 and sum function generator 22 generate a carry $C_n$ and a sum function $SF_n$ when the arithmetic and logical unit is operated as an adder. Via line 32 the carry $C_n$ is transferred, on the one hand, to the next higher digit position and, on the other, via line 34, to an Exclusive OR circuit 36, the second input of which is linked with the output of the sum function generator 22. When performing an addition, Exclusive OR circuit 36 emanates on its output the binary sum $S_n$ which is fed to an output line 40 via OR circuit 38. Output line 40 carries the result $R_n$ which is generated by the arithmetic and logical unit in the corresponding binary position during the performance of arithmetic or logical operations. The kind of operation to be carried out in each case is controlled by signals on control lines 42, 44, 46 and 48. Upon a signal "ADD v EO" occurring on line 46, the arithmetic and logical unit performs a binary addition or an Exclusive OR combination, whereas an "AND v EO" signal results in an AND or Exclusive OR combination. The signals occurring on lines 44 and 48 are complementary to the control signals on lines 42 and 46. While an "$\overline{\text{ADD}}$ v $\overline{\text{EO}}$" signal on line 48 indicates that neither an addition nor an Exclusive OR combinations is to be performed, an "$\overline{\text{AND}}$ v $\overline{\text{EO}}$" signal on line 44 means that the operation to be performed is neither an AND nor an Exclusive OR combination. Signals on lines 44 and 48 are indicative of the arithmetic and logical unit being in a state where the operand signals $A_n$, $B_n$ occurring on input lines 50, 52 are ORed, whereby the carry generator circuit 20 is inhibited by the signal on line 44 and the sum function generator circuit 22 by the signal on line 46. The OR result is formed by a bit function, constituting the OR combination of the operands, being transferred, via selector circuit 26, from line 28 to line 54 by means of the control signals on lines 44 and 48. The result signal from line 54, which constitutes the logical sum $LS_n$, is fed to output line 40 via OR-circuit 38. Upon emission of a control signal on lines 42 and 48 and with no signal occurring on lines 44 and 46 the selector gate circuit 26 is controlled for passing an "AND" bit function. The exclusive OR operation is performed upon control signals being applied to lines 46 and 44. Exclusive ORing of the operands is effected in the sum function generator 22 which for this purpose operates in the same manner as during additions. By means of the control signal on line 44 the carry generator 20 is blocked, so that while the operand bits are being processed no carry occurs on line 32. The result from the sum function generator circuit 22 is transmitted to output line 40 via Exclusive OR circuit 36 and OR circuit 38.

When performing logical combinations of the bit functions $BF_n$, the parity function generator 24 generates a parity function $PF_n$ which is used for checking the result of the combination. To this end the parity of the operands and the parity function $PF_n$ are combined by Exclusive ORing. The result of this combination corresponds to the parity of the result of the respective logical combination to be performed. For error detection, the parity of the logical result on line 40 and the parity derived by means of the parity function $PF_n$ are compared.

The parity function $PF_n$ required for a specific logical combination is selected by means of the control signals on lines 42 and 44. For the "OR" operation, which is indicated by the presence of a signal on lines 44 and 48 and the absence of a signal on lines 42 and 46, the parity function generator provides the AND combination of input signals $A_n$, $B_n$ on its output line 56. For the AND function, which is indicated by the presence of a signal on lines 42 and 48 and the absence of a signal on lines 44 and 46, the parity generator circuit supplies the result of the OR combination of the operands $A_n$, $B_n$ on line 56. The following table shows in detail how the parity functions affect the prediction of the result parity for OR and AND operations. In the table R is the result, $P_R$ the parity of the correct result (supplementation to odd numbers) and $VP_R$ the predicted parity.

Table 1

| | A | B | $P_A$ | $VP_BV$ | PF = $VP_R$ | | R | $P_R$ |
|---|---|---|---|---|---|---|---|---|
| OR: | 0 | 0 | 0 | 1 | 0 | 1 | 0 | 1 |
| | 0 | 1 | 1 | 1 | 0 | 0 | 1 | 0 |
| | 1 | 0 | 0 | 0 | 0 | 0 | 1 | 0 |
| | 1 | 1 | 1 | 0 | 1 | 0 | 1 | 0 |
| AND: | 1 | 1 | 0 | 1 | 0 | 1 | 0 | 1 |
| | 0 | 1 | 1 | 1 | 0 | 1 | 0 | 1 |
| | 1 | 0 | 0 | 0 | 1 | 1 | 0 | 1 |
| | 0 | 0 | 1 | 0 | 1 | 0 | 1 | 0 |

The carry generator circuit 20 in FIG. 2, in contrast to the carry generator 10 of the adder of FIG. 1, is designed so that when forming the carry both the carry of the next lower value position and the carries of all the other lower positions are considered. To this end circuit 20 is connected, via lines 58, 59, to the carry outputs and the bit function outputs, such as the output line 61 of the *n*th position. Deviating from the arrangement as shown, the operand bits can also be applied directly to the units 20, 22, 24 or 26. The arrangement may be such that the signals $C_n$, $SF_n$ and $LS_n$ are formed, using some of the bit functions $BF_n$ and the operand signals $A_n$, $B_n$.

Figure 3:
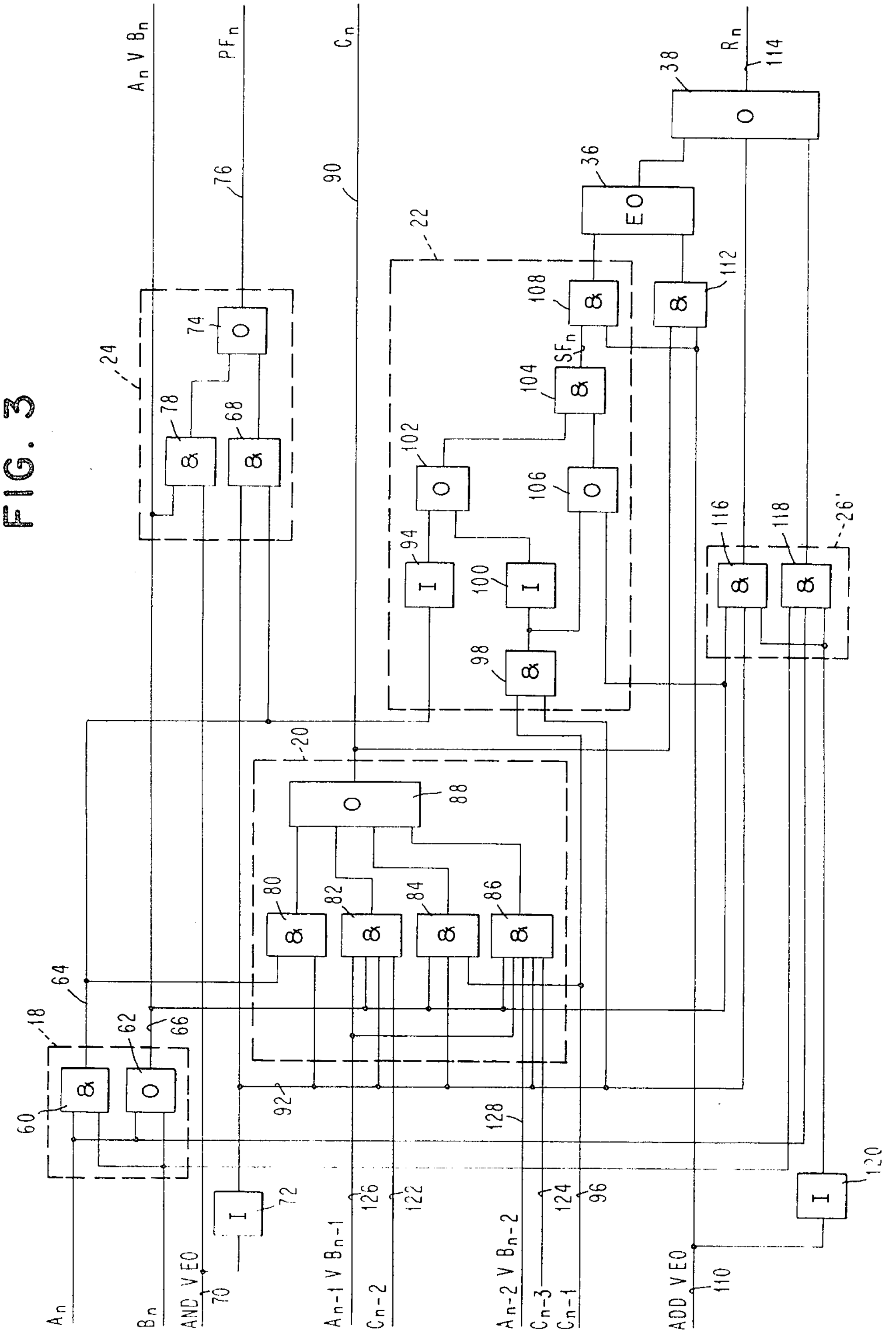
FIG. 3 detailed block diagram of a position of the arithmetic and logical unit in accordance with the invention.

The detailed design of a circuit which essentially corresponds to the arrangement of FIG. 2 is shown in the block diagram FIG. 3. In the bit function generator 18 the AND function is formed on line 64 from the operand bits $A_n$, $B_n$ by means of an AND-circuit 60 and the OR function on line 66 by means of an OR-circuit 62. Line 64 leads to an AND-circuit 68 in the parity function generator 24. The second input of this AND circuit is linked with the output of an inverter 72 which is connected to a control line 70 on which the control signal "AND v EO" occurs. Thus, the absence of this signal causes the AND-circuit 68 to be conditioned for signal transmission. The output of AND-circuit 68 is connected to output line 76 via an OR-circuit 74. Similarly, the OR function of the operand bits is transmitted to output line 76 from OR-circuit 62 to output line 76 via line 66, an AND-circuit 78 and OR-circuit 74 when line 70 carries a control signal for conditioning AND-circuit 78. Bit function lines 64 and 66 are also connected to carry generator circuit 20 which consists of AND-circuits 80, 82, 84 and 86 and OR-circuit 88. Carry generator circuit 20 forms the carry $C_n$ according to the relationship $$C_n = A_n \cdot B_n \ v(A_n \ v \ B_n) \cdot C_{n-1} \ V(A_{n-1} \ v \ B_{n-1}) \cdot (A_n \ v \ B_n) \cdot C_{n-2}$$
$$V(A_{n-2} \ v \ B_{n-2}) \cdot (A_{n-1} \ v \ B_{n-1}) \cdot (A_n \ v \ B_n) \cdot C \ n\text{-}3$$

where $C_{n-1}$, $C_{n-2}$ and $C_{n-3}$ are the carries of the next lower, the next but two and the next but three lower positions of the arithmetic and logical unit and where "$A_{n-1}$ v $B_{n-1}$" and "$A_{n-2}$ v $B_{n-2}$" are the OR bit functions of the next lower and the next but two lower positions. The second line of the above relationship is formed by AND-circuit 82 and the third line by AND-circuit 86, while AND-circuits 80 and 84 form the AND combinations of the first line. The OR functions of the corresponding *n* position is fed to AND-circuit 84 and AND-circuits 82 and 86 from bit function line 66. The outputs of AND-circuits 80, 82, 84 and 86 are connected to an OR-circuit 88, the output of which is linked with a carry output line 90. AND-circuits 80, 82, 84 and 86 are provided with one additional input each, which is connected to the output line 92 of inverter 72 and through which the carry generator circuit 20 is blocked when line 70 carries a control signal.

Bit function lines 64 and 66 are moreover connected to sum function generator 22 which forms the sum function $SF_n$ according to the relationship $$SF_n=(\overline{A_n} \cdot \overline{B_n} \ v \ \overline{C_{n-1}}) \cdot (A_n \ v \ B_n \ v \ C_{n-1})$$

The component $\overline{A_n} \cdot \overline{B_n}$ v $\overline{C_{n-1}}$ is derived from the AND bit function of line 64 by means of an inverter 94 and from the carry of the next lower position on line 96 through an AND-circuit 98 and an inverter 100. An OR-circuit 102, the output of which leads to an AND-circuit 104, is linked with the outputs of inverters 94 and 100. For forming the right-hand part of the above relationship, the OR bit function of line 66 and the output signal of AND-circuit 98 are fed to an OR-circuit 106, the output of which is connected to the second input of AND-circuit 104 on whose output the sum function $SF_n$ occurs. The second input of AND-circuit 98 is linked with line 92, so that the carry of the next lower position on line 96 is only transmitted to sum function generator 22 when no "AND v EO" signal is present on line 70.

Sum function signal $SF_n$ is transmitted, via an AND-circuit 108, to Exclusive OR-circuit 36 when the ADD v EO control signal is present on line 110. The same control signal also conditions on AND-circuit 112 for transmitting the output signal from the carry generator circuit 20 to the second input of Exclusive OR-circuit 36. The generated carry $C_n$ and the sum function $SF_n$ are combined in Exclusive OR-circuit 36 in the manner described. The output of this circuit is linked with the result output line 114 through OR-circuit 38.

The outputs of AND-circuits 116 and 118, which form a unit 26' corresponding to the selector gate circuit 26 of FIG. 2, are connected to two further inputs of OR-circuit 38. In contrast to FIG. 2, circuit 26' receives both the operand bits $A_n$, $B_n$ and some of the bit functions of bit function generator 18, i.e., the OR functions. The two AND-circuits 116, 118 are activated by means of an inverter 120 when no signal is present on control line 110. AND-circuit 116 is additionally controlled from the output of inverter 72 via line 92. This AND circuit serves to transfer the OR bit function to result output 114 when neither of the two lines 70 and 110 carries a signal. Via AND-circuit 118 the AND bit function is transferred from line 64 to the result output 114 when no signal is present on line 110. At that time AND circuit 116 is blocked by no signal being present on line 92.

Figure 4:
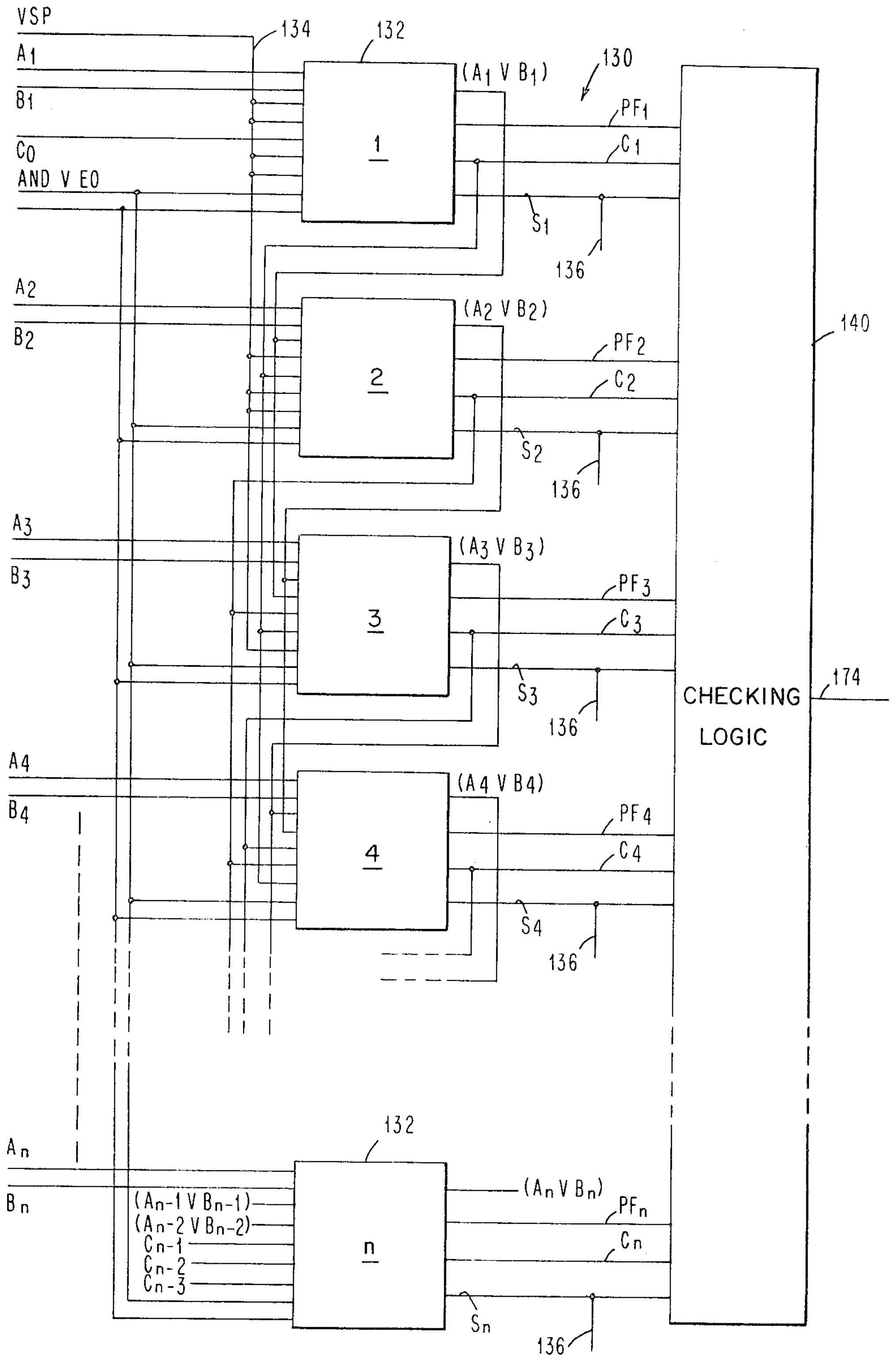
FIG. 4 simplified block diagram of the complete arithmetic and logical unit in accordance with the invention and FIG. 5 checking circuit as is employed in conjunction with the arrangement in accordance with FIG. 4.

FIG. 4 shows how several stages of the kind described in FIG. 3 are interconnected to form the complete arithmetic and logical unit 130. Each of the blocks 132 is formed by a circuit in accordance with FIG. 3. The inputs and outputs of the blocks are designated according to FIG. 3. The individual positions of unit 130 are referred to as 1 to *n*, where 1 is the lowest and *n* the highest position. At position 1 the inputs of signals $C_{n-1}$, $C_{n-2}$, $C_{n-3}$, $A_{n-1}$ v $B_{n-1}$, $A_{n-2}$ v $B_{n-2}$ (lines 96, 122, 124, 126, 128 in FIG. 3) are connected, via line 134, to a fixed bias VSP, the voltage of which causes 0-input signals to be generated at the said inputs. In the same manner, the lines at position 2, which correspond to input lines 122, 124, 128 (FIG. 3), are linked with bias line 134. The same applies to the $C_{n-3}$ input line 124 at position 3.

Figure 5:
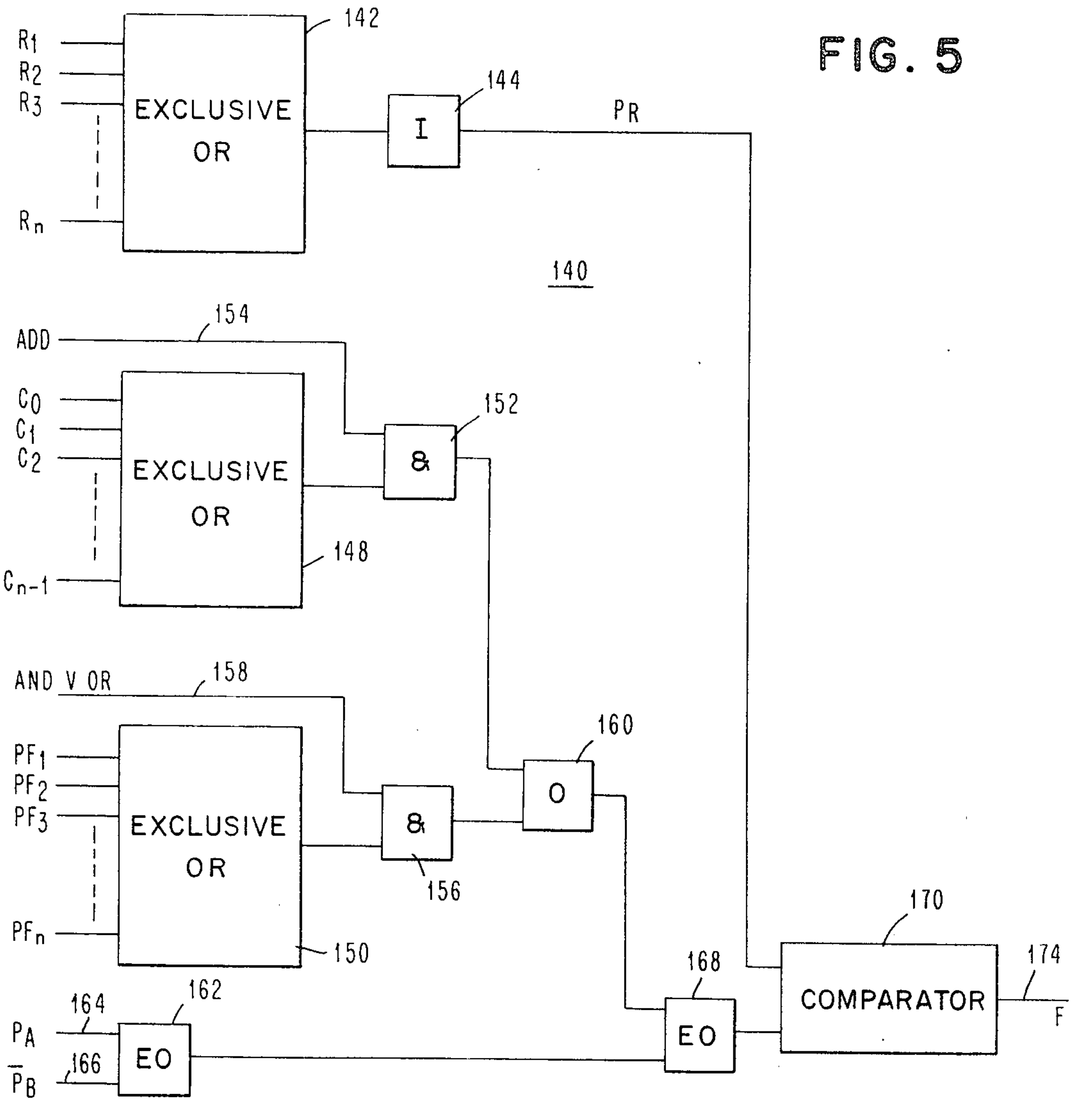
Figure 6:
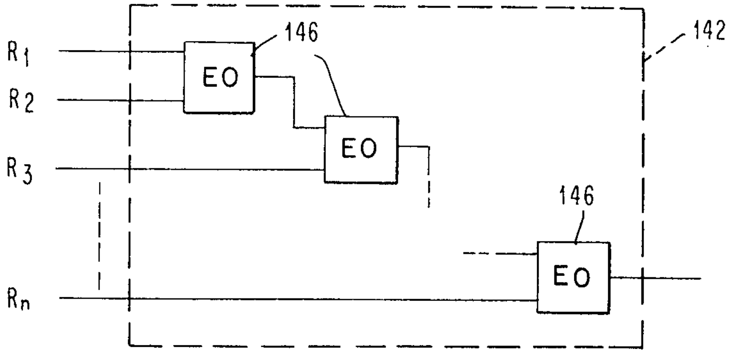
FIG. 6 shows the internal configuration of the Exclusive OR circuits.

The output lines of blocks 132 for the result digit $R_1$ to $R_n$, the carries $C_1$ to $C_n$ and the parity functions $PF_1$ to $PF_n$ are linked with a checking logic 14 which forms part of the arithmetic and logical unit 130. The results signals $R_1$ to $R_n$, via line 136, are moreover transmitted to connected units of the data processor in which the arithmetic and logical unit is employed. FIG. 5 is a block diagram of the checking logic. A first Exclusive OR circuit 142 serves to combine the result signals $R_1$ to $R_n$ of the arithmetic and logical unit 130. As is shown in FIG. 6, circuit 142 may consist of several series-connected Exclusive OR circuits 146. An inverter 144, on whose output the parity $P_R$ of the result generated by the arithmetic and logical unit 130 occurs, is linked with the output of circuit 142. The checking logic 140 comprises two further Exclusive OR circuits 148 and 150, both of which are designed similar to circuit 142. The carries $C_0$, $C_1$-$C_{n-1}$, which are generated by the positions 1 to *n*-1 of unit 130 during addition, are combined by Exclusive ORing. The output of this circuit leads to an AND-circuit 152, the second input of which is linked with a control line 154 on which an addition control signal "ADD" occurs when an addition is being carried out.

Exclusive OR-circuit 150 serves in a similar manner to combine by Exclusive ORing the parity functions $PF_1$ to $PF_n$ which are generated in the positions 1 to *n* of unit 130 during the execution of a logical operation. A control signal "AND v OR" on line 158 causes the output signal of circuit 150 to be transferred to an OR-circuit 160, the second input of which is linked with the output of AND-circuit 152.

Exclusive OR-circuit 162 receives the parity indication signal $P_A$ of operand A on one input 164 and the inverted parity indication signal $\overline{P_B}$ of operand B on the other input 166. The output of Exclusive OR circuit 162 is connected to a further Exclusive OR circuit 168, the second input of which is linked with OR-circuit 160. The output of Exclusive OR circuit 168 leads to a comparator 170. The second input of this comparator is connected to inverter 144 via a line 172. In the embodiment as described, the comparator 170 may take the form of an Exclusive OR circuit. The comparator comprises an output line 174 on which an error indication signal F occurs in the case of a faulty operation of the arithmetic and logical unit 130.

The operation of the arithmetic and logical unit 130 is described by means of the following table II in which the parity check for additions, OR, AND and Exclusive OR operations is represented with the aid of one-digit operand combinations. Supplementation to an odd binary value forms the basis for the parity in the table. Erroneous binary values are asterisked.

TABLE II

| | A | B | C | R | $P_A$ | $\veebar \overline{P_B} \veebar C/PF \equiv P_R$ | | | F |
|---|---|---|---|---|---|---|---|---|---|
| Addition: | 0 | 0 | 0 | 0 | 1 | 0 | 0 | 1 | 0 |
| | 1 | 0 | 0 | 1 | 0 | 0 | 0 | 0 | 0 |
| | 0 | 1 | 0 | 1 | 1 | 1 | 0 | 0 | 0 |
| | 1 | 1 | 0 | 1* | 0 | 1 | 0 | 0* | 1 |
| | 0 | 0 | 1 | 1 | 1 | 0 | 1 | 0 | 0 |
| | 1 | 0 | 1 | 0 | 0 | 0 | 1 | 1 | 0 |
| | 0 | 1 | 1 | 0 | 1 | 1 | 1 | 1 | 0 |
| | 1 | 1 | 1 | 1 | 0 | 1 | 1 | 0 | 0 |
| OR: | 0 | 0 | | 0 | 1 | 0 | 0 | 1 | 0 |
| | 1 | 0 | | 1 | 0 | 0 | 0 | 0 | 0 |
| | 0 | 1 | | 0* | 1 | 1 | 0 | 1* | 1 |
| | 1 | 1 | | 1 | 0 | 1 | 1 | 0 | 0 |
| AND | 0 | 0 | | 0 | 1 | 0 | 0 | 1 | 0 |
| | 1 | 0 | | 0 | 0 | 0 | 1 | 1 | 0 |
| | 0 | 1 | | 0 | 1 | 1 | 1 | 1 | 0 |
| | 1 | 1 | | 1 | 0 | 1 | 1 | 0 | 0 |
| Exclusive | | | | | | $\veebar \overline{P_B} \veebar C/PF \equiv PR$ | | | |
| OR: | 0 | 0 | | 0 | 1 | 0 | | 1 | 0 |
| | 1 | 0 | | 1 | 0 | 0 | | 0 | 0 |
| | 0 | 1 | | 1 | 1 | 1 | | 0 | 0 |
| | 1 | 1 | | 0 | 0 | 1 | | 1 | 0 |

The ORing of the operands A = 0, B = 1 is considered below. Assuming a technical fault, such as, for example, the breakdown of a transistor, causes the erroneous result signal 0 to be formed in the circuit of one of the positions 1 - *n* in unit 130. Disregarding the other positions, this would result in Exclusive OR circuit 142 producing a binary 0 on its output, so that inverter 144 would provide a binary 1 as a $P_R$ signal. As will be seen from the table, Exclusive OR circuit 162 also generates a 1-output signal, since a 1-signal is applied to its two inputs 164 and 166. Additionally, a 0-signal, as the parity function $P_F$, is applied to line 76 of the corresponding position. This causes Exclusive OR circuit 150 to generate no output signal, so that AND-circuit 158, conditioned by an OR control signal on line 158, remains inactive. Neither of the 2 inputs of Exclusive OR circuit 168 receives a signal, so that comparator 170 only receives a 1-signal on line 172, which causes an error indication on output line 174.

Also considered is the addition of the operands A = 1 and B = 1, whereby it is assumed that there is no carry from the next lower position. An erroneous sum bit 1 again results in an erroneous result parity $P_R$, which, as a result, assumes the value 0. Exclusive OR circuit 162 (FIG. 5) supplies an output signal, since the parity of operand A is zero and the inverted parity of operand B is one. As there is no carry, the output signal of Exclusive OR circuit 148 is zero. AND-circuit 152, which is conditioned by an addition control signal on line 154, thus transfers no signal to OR-circuit 160. Exclusive OR circuit 168 merely receives an input signal and applies an output signal to comparator 170. As the output signal of Exclusive OR circuit 142 result in line 172 carrying no signal, comparator 170 emits an error indication signal.

The above examples show that both for arithmetic and logical operations the parity of the result signal is checked against a parity indication which is derived independently of the result and that an erroneous result leads to an error indication. As the check extends to all positions of unit 130, individual errors are indicated independently of the position in which they occur. Additionally, there are indicated any errors which are due to erroneous control signals on lines 70, 92 or 110 (FIG. 3) or a breakdown of these lines. Thus, for example, an erroneous output signal $R_n$ of an OR or AND operation, which is produced on the input of circuit 26′ due to a breakdown of line 92, is detected in the checking logic, since the correct parity function PF causes the actual result parity $P_R$ and the predicted result parity $P_A \forall \overline{P_B} \forall PF$ to differ.

What is claimed is:

1. An arithmetic and logical unit for performing "Adding," "AND," "OR" and "Exclusive-OR" operations with carry-dependent sum formation for the purpose of error-checking the carry and sum bits by parity prediction by means of Exclusive-ORing of the operand and carry parities and by comparing the predicted with the actual result parity, comprising:
- a source of operation control signals for selecting logical operations;
- a function generator circuit operatively connected to said source which, as a function of said operation control signals, produces a bit parity function relates to the respective operation;
- a source of operand parity signals;
- a checking circuit comprising means for Exclusive-ORing said operand parity with said parity function, independently of the result of the logical operation to be executed, to generate the predicted parity; and
- comparison means for comparing said predicted parity to the actual result parity.

2. An arithmetic and logical unit in accordance with claim 1 further comprising:
- means within said function generator for generating result bits in accordance with the selected logical operation;
- means within said function generator for generating carries during an addition operation;
- means for providing the operand parity of each input operand;
- a first group of Exclusive-OR circuits which form the result parity of the generated result bits;
- at least one second group of Exclusive-OR circuits which, as a function of operation control signals, form the parity of the processed carries during addition and the parity of the parity functions of the individual positions during the execution of a logical operation;
- a first individual Exclusive-OR circuit for combining the operand parities; and
- a second individual Exclusive-OR circuit for combining the output signal of the second group of Exclusive-OR circuits with the output signal of the first individual Exclusive-OR circuit to form the predicted parity;
- the output of the second individual Exclusive-OR circuit being connected to said comparison means, the second input of which is formed by the output of the first group of Exclusive-OR circuits.

3. An arithmetic and logical unit in accordance with claim 2 further including means for inverting one of the operand parities provided to said first individual Exclusive-OR circuit.

4. An arithmetic and logical unit in accordance with claim 3, wherein the function generator circuit comprises means for generating at an output the logical OR of the input operands when the operation control signals specify the "AND" operation and for generating at an output the logical AND of the input operands when the operation control signals specify the "OR" operation.

5. An arithmetic and logical unit in accordance with claim 4, wherein:
- there is provided a logical combine circuit which derives AND and OR bit functions from the operand bits; and
- the function generator circuit comprises gate circuits, to the input of each of which is applied one of said bit functions, and the output of each of which, depending upon the respective operation control signal, is selectively connected to said checking circuit.

6. An arithmetic and logical unit in accordance with claim 5, wherein at least some of the output lines of the logical combine circuit are connected to a carry generator and a sum function generator circuit which, in a predetermined manner, form a carry in accordance with the relationship $(A_n \cdot B_n) \vee (A_n \cdot C_{n-1}) \vee (B_n \cdot C_{n-1})$ and a sum function in accordance with the relationship $(A_{n\,v\,Bn} \vee C_{n-1}) \cdot (\overline{A_n} \vee \overline{B_n} \vee \overline{C_{n-1}})$, where $A_n$ and $B_n$ are the operand bits of the respective position and $C_{n-1}$ is a carry accruing to that position.

7. An arithmetic and logical unit in accordance with claim 6, wherein the carry generator receives the carry of more than one adjoining lower position together with the OR functions of the logical combine circuits of such positions, and the carry generator forms the carry in accordance with the relationship $$C_n = A_n \cdot B_n \vee (A_n \vee B_n) \cdot C_{n-1} \vee (A_{n-1} \vee B_{n-1}) \cdot (A_n \vee B_n) \cdot C_{n-2} \vee (A_{n-2} \vee B_{n-2}) \cdot (A_{n-1} \vee B_{n-1}) \cdot (A_n \vee B_n) \cdot C_{n-3}$$

* * * * *